No. 642,397. Patented Jan. 30, 1900.
E. C. WESTERVELT & C. W. CLAPP.
CULTIVATOR.
(Application filed June 21, 1899.)
(No Model.) 3 Sheets—Sheet 1.
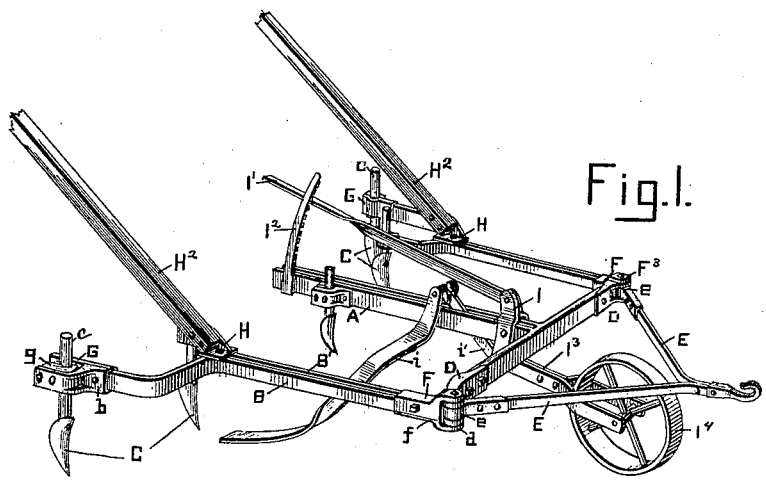
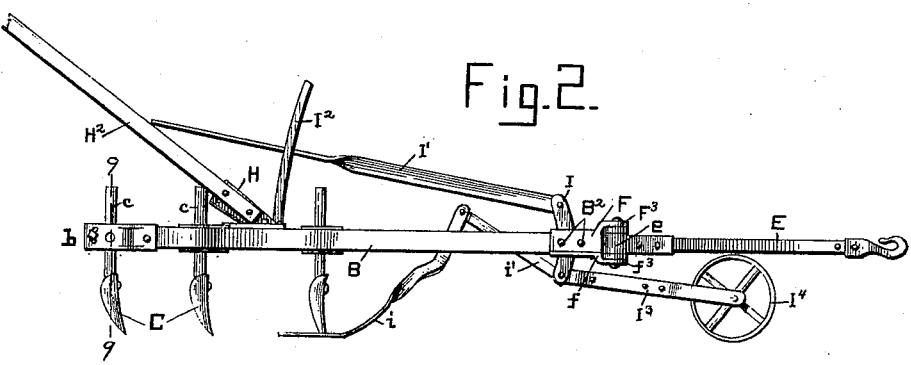
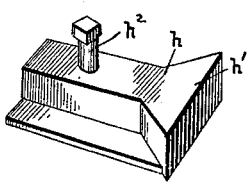

No. 642,397. Patented Jan. 30, 1900.
E. C. WESTERVELT & C. W. CLAPP.
CULTIVATOR.
(Application filed June 21, 1899.)

(No Model.) 3 Sheets—Sheet 2.

Witnesses:
H. S. Austin.
James R. Mansfield.

Inventors:
Edmund C. Westervelt
and Charles W. Clapp.
By Alexander Donnell
Attorneys

THE NORRIS PETERS CO., PHOTO-LITHO., WASHINGTON, D. C.

No. 642,397. Patented Jan. 30, 1900.
E. C. WESTERVELT & C. W. CLAPP.
CULTIVATOR.
(Application filed June 21, 1899.)
(No Model.) 3 Sheets—Sheet 3.

Witnesses
H. S. Austin.
James R. Mansfield

Inventors:
Edmund C. Westervelt
and Charles W. Clapp
By Alexander Bowell
Attorney

UNITED STATES PATENT OFFICE.

EDMUND C. WESTERVELT AND CHARLES W. CLAPP, OF SOUTH BEND, INDIANA.

CULTIVATOR.

SPECIFICATION forming part of Letters Patent No. 642,397, dated January 30, 1900.

Application filed June 21, 1899. Serial No. 721,398. (No model.)

*To all whom it may concern:*

Be it known that we, EDMUND C. WESTERVELT and CHARLES W. CLAPP, of South Bend, St. Joseph county, Indiana, have invented certain new and useful Improvements in Cultivators; and we hereby declare that the following is a full, clear, and exact description thereof, reference being had to the accompanying drawings, which form part of this specification.

This invention is an improvement in cultivators especially designed for cultivating rows of small plants or young corn; and its object is to provide a machine which can be adapted to various widths of furrows, can easily be controlled by the plowman, and in which the depth of the furrow or cuts can be regulated, and, further, if desired, the shovels can be raised clear of the ground during transportation of the apparatus.

Further objects of the invention are to provide novel adjusting devices for the shafts and novel connections between the cultivator-beams and the frame and draft-beam; and the invention consists in the novel constructions and combinations of parts hereinafter claimed and described in detail with reference to the accompanying drawings, forming part of this specification.

Figure 3:
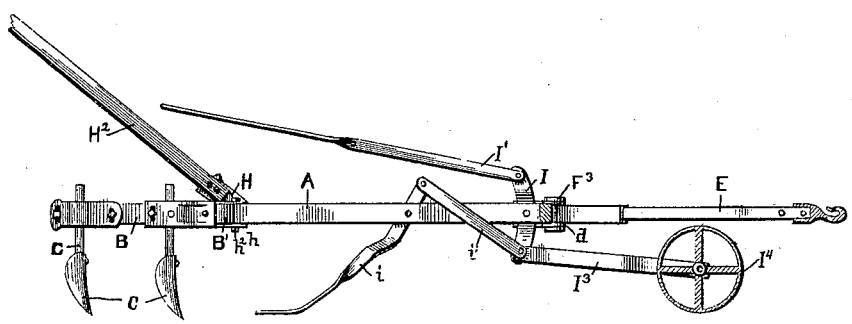
Figure 4:
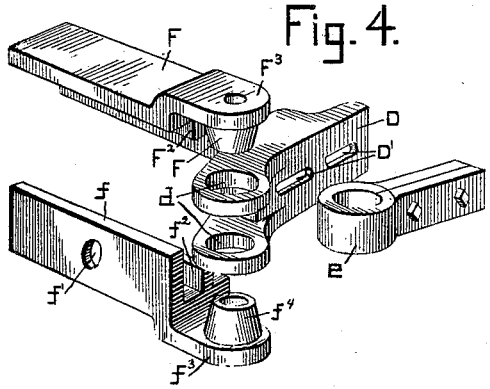
Figure 6:
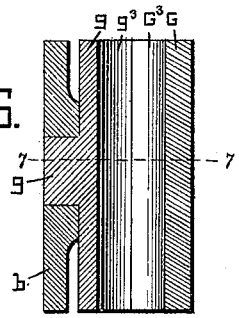
Figure 8:
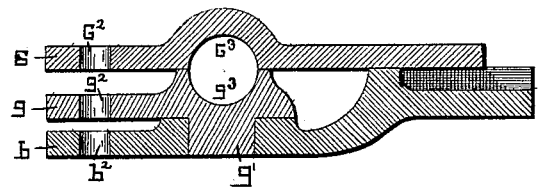
Figure 7:
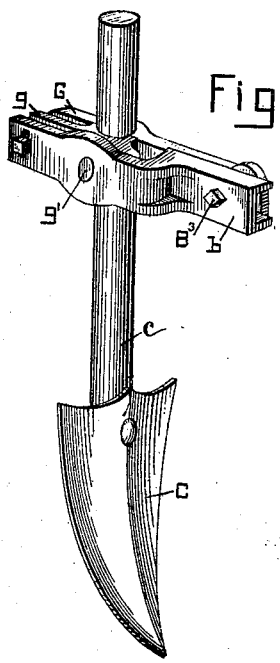
Figure 9:
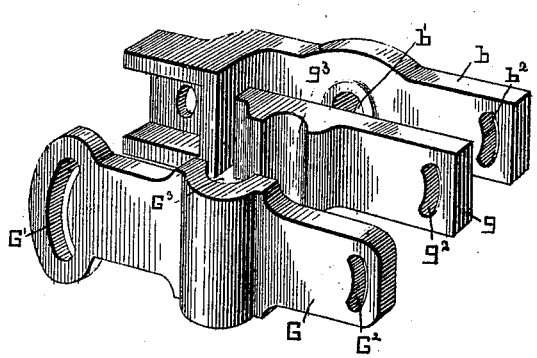
Figure 10:
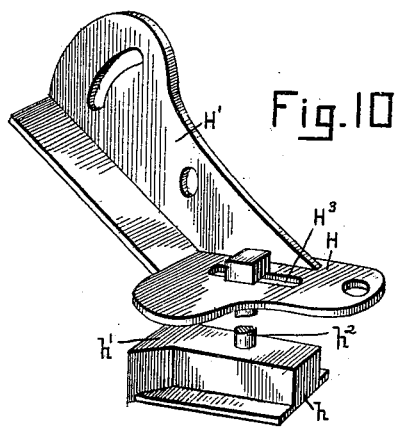
Figure 11:
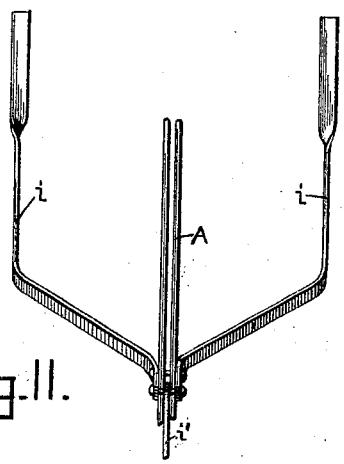

Referring to said drawings, Figure 1 is a perspective view of the complete cultivator. Fig. 2 is a side elevation thereof. Fig. 3 is a longitudinal section thereof. Fig. 4 is an enlarged perspective view of the several parts of the connection between the cultivator-beam, the frame, and the draft-bars disconnected. Fig. 5 is a detail perspective view of the cultivator-bar-spreading wedge. Fig. 6 is a detail transverse section, enlarged, on line 9 9, Fig. 2. Fig. 7 is an enlarged perspective view of the shovel attaching and adjusting devices. Fig. 8 is an enlarged horizontal section on line 7 7, Fig. 6. Fig. 9 is a detail perspective view of the reverse parts of the shovel-attaching device disconnected. Fig. 10 is a detail perspective view of handle-adjusting casting and wedge-plate. Fig. 11 is a plan view of the shoes.

A designates the frame of the machine, preferably T-shaped and constructed of metal, and to the opposite ends of the head of this frame are pivotally connected the opposite cultivator-beams B. Each cultivator-beam is preferably composed of two bars B B', parallel at their forward portions, but diverging at their rear portions, and to the diverging ends of these bars are connected the shovels C C.

The connection between the cultivator-beams and the head of the frame is one of the novel features of this invention and is shown in detail in Fig. 4, and referring thereto D designates a casting, one of which is secured to each end of the head of frame A. The casting is provided with slots D' for the passage of retaining-bolts which are secured to said head, and is also provided at its projecting extremity with horizontal eyes $d$, arranged one vertically over the other and sufficiently separated to allow a loop $e$ on the end of draft-beam D to be inserted between the eyes $d$. To the front ends of the bars B' composing the cultivator-beam are bolted the castings F $f$, which castings are adapted to respectively fit over the bottom and one side and top and other side of the end of the beam and are secured thereto by means of transverse bolts $B^2$, which pass through perforations F' and $f'$ in the vertical webs of castings F $f$, as shown. The horizontal portions of these castings may be provided with ribs $F^2$ and $f^2$ to separate the members B' of the beams, if desired. The horizontal portions of these castings are respectively provided with projecting ears $F^3$ and $f^3$, from the inner faces of which extend tapered lugs $F^4$ and $f^4$, which lugs are adapted to pass through the eyes $d$ of casting D, thereby securing the cultivator-beam to the frame, and to meet in the loop $e$, thereby securing the draft-beam E to the head and to the cultivator-beam. The simplicity and utility of this construction will be obvious from the drawings.

The means for adjustably attaching shovels C to the bars F of the cultivator is another novel feature of the invention and is shown in detail in Figs. 6, 7, and 8.

A casting $b$ is fitted to the end of each bar B' and secured thereto by a bolt $B^3$. This casting $b$ is provided with a vertically-disposed extension, in which is a large eye $b'$, and in rear of this is a curved slot $b^2$. In this eye $b'$ is fitted the cylindrical boss $g'$ of a casting $g$, having a slot $g^2$ registering with a slot $b^2$ and having in its face, opposite the boss $g'$, a vertical semicylindrical groove $g^3$. Beside the castings $b\ g$ is a casting G, which is provided at one end with a curved slot $G'$ (through which passes the bolt $B^3$) and at its other end with a curved slot $G^2$, adapted to register with the slots $g^2$ and $b^2$, all of said slots being transfixed by the same bolt $G^5$. Casting G is also provided with a vertically-disposed semicylindrical recess $G^3$, which is opposite the recess $g^3$ in casting $g$, and through these coincident grooves $G^3\ g^3$ passes the shovel-supporting rod $c$, supporting on its lower end the shovel C. By reference to the drawings it will be observed that while casting $b$ is rigid with the bar B the castings $G\ g$ are adjustable in relation thereto, so that the shovel-supporting rods can be adjusted to different angles relatively to the bars $B'$. Thus the shovels can be adjusted to any position desired by the operator.

At the point where the bars $B'$ diverge the handle-supporting casting H is attached. This casting is provided with an upwardly and rearwardly inclined extension $H'$, to which handle $H^2$ may be attached in the usual manner. Underneath the plate H and interposed between the bars $B'$ is a wedge-plate casting $h$, which is provided with a wedge portion $h'$, which projects between the bars $B'$ and is adapted to separate the latter more or less, according as the wedge-plate is adjusted more or less toward the front end of the bars. The castings H $h$ are secured in position and together by means of through-bolts $h^2$, casting H being provided with a slot $H^3$ to permit the adjustment of wedge-plate $h'$.

To the stem of the frame A, just in rear of its head, is pivoted a bent lever I, which is provided with a rearwardly-extending handle portion $I'$, adapted to engage the ratcheted keeper $I^2$, attached to the rear extremity of the stem of the frame, as shown. The lever I below the pivot is bent forwardly and downwardly and extends beyond the front of the frame, as shown at $I^3$, and this portion $I^3$ is provided with bearings for the wheel $I^4$, as shown. The parts I $I'$ $I^3$ of the lever may be made in one piece or in sections rigidly united, so that when the handle $I'$ is depressed the wheel $I^4$ will be elevated, and vice versa. Upon the stem of the frame, in rear of the pivot of lever I, are pivoted the opposite runners or shoes $i$, which diverge as shown. The upper ends of the shoes normally project above the stem of the frame and are connected by a link $i'$ to the lever I below the pivot thereof, as shown, so that the lower ends of the shoes will be raised or lowered simultaneously with the raising or lowering of the wheel $I^4$ and be controlled by the same lever $I'$.

By means of the handle I the position of the wheel and shoes can be so adjusted as to cause the shovels to make deep or light furrows, as the operator may desire.

From the foregoing description it will be obvious that we have produced an improved cultivator which has all the necessary adjustments for accommodating it to varying stiffness of the soil, and it can be readily adapted to different kinds and conditions of crops to be cultivated and set to make the shovels operate at any desired depth.

Having thus described our invention, what we therefore claim as new, and desire to secure by Letters Patent thereon, is—

1. The combination of the frame, and a cultivator-beam, the casting D provided with eyes $d$, $d$, attached to one of said members and the opposite castings F, $f$, attached to the other member, and provided with lugs adapted to engage the eyes on the casting D, for the purpose and substantially as described.

2. In a cultivator, the combination of the frame, the draft-bar having a loop or eye $e$ and the cultivator-beam; with the casting D provided with eyes $d$, $d$, the opposite castings F, $f$, provided with projections $F^4$, $f^4$, adapted to transfix the eyes $d$ on castings D and to meet within a loop $e$ on the draft-beam whereby the cultivator-beam is hinged to the frame and the draft-beam hinged to both, for the purpose and substantially as described.

3. The combination of the frame, and the slotted casting D secured thereto provided with upper and lower eyes $d$; with a cultivator-beam, the upper and lower angular castings F, $f$, attached to the forward extremity of said beam, by means of bolts $B^2$, the castings being provided with forward extensions and said extensions having lugs $F^4$ and $f^4$ adapted to engage the eyes $d$, substantially as described.

4. The combination of the frame, the slotted casting $D'$ secured thereto, provided with upper and lower eyes $d$; a cultivator-beam, upper and lower angular castings F, $f$, attached to the forward extremity of said beam, by means of bolt $B^2$, the castings being provided with forward extensions and said extensions having conical lugs $F^4$ and $f^4$ adapted to engage the eyes $d$; with the draft-beams having a loop $e$, said loop being adapted to be inserted between the eyes $d$ and to be transfixed by the lugs $F^4$ and $f^4$, all for the purpose and substantially as described.

5. In a cultivator, the combination of the opposite shovel-carrying bars, a handle-attaching casting H attached to said bars at their point of divergence and the wedge-shaped casting $h$ interposed between said bars, for the purpose and substantially as described.

6. In a cultivator, the combination of the cultivator-beam composed of the opposite bars $B'$, a slotted casting H attached to said bars at their point of divergence and the adjustable wedge-shaped casting $h$ interposed between said bars, below the casting H and adjustably secured in position by a bolt $h'$, engaging the slot in casting H, for the purpose and substantially as described.

7. In a shovel-adjusting device for cultivators, the combination of the opposite adjustable castings G, $g$, provided with coincident grooves for the reception of the shovel-supporting rod or tang; with means for shifting said castings to adjust the rod to different inclinations, and means for locking said casting when desired.

8. The combination of the adjustable casting provided with a trunnion and a groove as $g^3$, and means for supporting said casting; with a coacting casting having a groove as $G^3$ registering with groove $g^3$; and means for adjusting and locking said castings relatively to each other and the shovel-supporting rod or tang held in the grooves $G^3$ and $g^3$, substantially as described.

9. In a shovel holding and adjusting device, the combination of a casting provided with a trunnion as $g'$ by which it is mounted in a suitable support and with a substantially vertical groove $g^3$; with the opposite castings G provided with a groove $G^3$ registering with a groove $g^3$ and with opposite slots in its ends, for the passage of securing-bolts for the purpose and substantially as described.

10. In a shovel holding and adjusting device, the combination of the cultivator-bar, a casting as $b$ secured to the end thereof provided with an eye $b'$ the casting $g$ having a trunnion $g'$ engaging eye $b'$, and a vertical groove as $g^3$ and a casting G having a groove $G^3$ coinciding with the groove $g^3$, and the shovel-supporting rod or standard passing through and clamped in the grooves $G^3$ and $g^3$, for the purpose and substantially as described.

11. In a shovel holding and adjusting device, the combination of a rocking casting provided with a trunnion $g'$ by which it is mounted in a suitable support; a slot $g^2$ transfixed by a locking-bolt and a substantially vertical groove $g^3$; with the opposite casting G provided with a groove $G^3$ registering with groove $g^3$ and having opposite slots in its ends for the passage of the securing-bolts, for the purpose and substantially as described.

12. In a shovel holding and adjusting device, the combination of the cultivator-bar, a casting $b$ secured to the end thereof provided with an eye $b'$ and slot $b^2$; the casting $g$ having a trunnion $g'$ engaging eye $b'$, a slot $g^2$ coinciding with slot $b^2$, and a vertical groove as $g^3$; and a casting G having a slot $G'$ for the engagement of a securing-bolt, a groove $G^3$ coinciding with the groove $g^3$ and a slot $G^2$ coincident with the slots $b^2$, $g^2$; a bolt passing through said coincident slots, and the shovel-supporting rod or standard passing through and clamped in the grooves $G^3$ and $g^3$, for the purpose and substantially as described.

13. In a cultivator, the combination of the T-headed frame, the cultivator-beams pivotally connected to the opposite ends of the head of said frame, the angular lever pivoted to the stem of said frame and carrying a wheel on its lower forwardly-projecting end, and the shoe-arms pivoted to the frame in rear of the said lever, and the links connecting the lower part of said lever to the upper ends of said shoes whereby the movement of said lever causes the simultaneous lifting or lowering of the wheels and shoes, for the purpose and substantially as described.

14. In a cultivator, the combination of the T-shaped frame, the cultivator-beams pivotally connected to the ends of the T-head of said frame, the handles and adjustable shovel-attaching devices connected to the said beams, the adjustable lever pivoted to the stem of said frame and carrying a wheel, the adjustable rearwardly-inclined shoes connected to the stem of said frame, and the connections between said shoe and lever for simultaneously raising and lowering the wheel and shoes, for the purposes and substantially as described.

15. In a cultivator, the combination of the frame, the cultivator-beams B, B, pivotally connected thereto, the shovels attached to the diverging ends of said beams and the handles for adjusting the beams; the angular lever I pivotally connected to the stem of said frame having a forward extension $I^3$ carrying a wheel, and a rearward extension $I'$ forming an adjustable handle, and a ratchet-keeper for locking said handle in any position to which it is to be adjusted; with the shoes $i$, $i$, pivoted to the stem of the frame in rear of the pivot of the lever I, and the link $i'$ connecting the ends of the shoes $i$, $i$, above their pivots to the lever I below its pivot, for the purpose and substantially as described.

In testimony that we claim the foregoing as our own we affix our signatures in presence of two witnesses.

EDMUND C. WESTERVELT.
CHAS. W. CLAPP.

Witnesses:
JAMES DUSHANE,
WM. CLEARY SULLIVAN.